United States Patent [19]

McGlynn

[11] 4,072,850
[45] Feb. 7, 1978

[54] VEHICLE USAGE MONITORING AND RECORDING SYSTEM

[76] Inventor: Daniel R. McGlynn, 329-84th St., Brooklyn, N.Y. 11209

[21] Appl. No.: 612,195

[22] Filed: Sept. 10, 1975

Related U.S. Application Data

[63] Continuation-in-part of Ser. No. 538,356, Jan. 3, 1975, Pat. No. 4,013,875, which is a continuation-in-part of Ser. No. 432,691, Jan. 11, 1974, abandoned.

[51] Int. Cl.² ............... B60K 26/00; G08B 21/00
[52] U.S. Cl. .................... 364/424; 340/52 F; 340/53; 340/149 A
[58] Field of Search ............ 235/150.2; 340/52 R, 340/52 F, 53, 63, 64, 149 R, 149 A, 23, 147 R, 172.5

[56] References Cited

U.S. PATENT DOCUMENTS

| | | | |
|---|---|---|---|
| 3,848,229 | 11/1974 | Perron et al. | 340/149 A |
| 3,906,207 | 9/1975 | Rivere et al. | 235/150.2 |
| 3,913,086 | 10/1975 | Adler et al. | 340/53 |
| 3,944,976 | 3/1976 | France | 340/149 A X |

*Primary Examiner*—Charles E. Atkinson

[57] ABSTRACT

An arrangement for use in a vehicle, including a reading unit for reading information from a portable information-providing instrument; data input means in the vehicle for providing data input from a sensor in the vehicle; enabling means in the vehicle connectable with the reading unit or the data input unit for processing provided information of data input unit for processing provided information or data; and recording means in the vehicle connectable with the reading unit, the data input unit, and the enabling unit in the vehicle for recording at least a portion of the information or data so provided or processed on a portable record carrier.

20 Claims, 2 Drawing Figures

VEHICLE USAGE MONITORING AND RECORDING SYSTEM

CROSS REFERENCE TO RELATED APPLICATIONS

This is a continuation-in-part of U.S. application Ser. No. 538,356, filed Jan. 3, 1975, now U.S. Pat. No. 4,013,875, which is a continuation-in-part of U.S. application Ser. No. 432,691, filed Jan. 11, 1974, and now abandoned.

BACKGROUND OF THE INVENTION

The invention relates to an arrangement for use in a vehicle for monitoring, processing, and recording usage or operatonal information. The invention also relates to an arrangement in a vehicle for authorizing operation of the vehicle by means of a portable, information providing instrument.

Systems are known in the prior art for use in such applications as automobile rental systems, or for the automatic identification and monitoring of specially designated vehicles such as buses, police ares, railroad cars, and aircraft. Such systems utilize relatively simple means in the vehicle, such as a keyboard or card reader for encoding identification or other information for transmission to a remote external location utilizing very high frequency radio or radar transponder communication systems.

Such prior art systems, represented by U.S. Pats. Nos. 3,624,608; 3,665,397 and 3,644,883 are relatively limited in the complexity of the processing function which may be performed in the vehicle itself. The information or data is typically transferred to a large central computer at the remote location from the vehicle for accounting and processing purposes.

Other approaches of the prior art, such as a use of a mini-computer or random digital logic circuit in a vehicle to perform specific control or operational functions would be too expensive or complicated. The relatively high price of minicomputers or random logic implimentation of a control function makes such devices impractical for use in a vehicle. Prior to the present invention it has not been feasible or practical to implement a programmable control system for monitoring, processing, and recording identification, usage, or other operational information in an inexpensive manner in a vehicle.

SUMMARY OF THE INVENTION

It is an object of the invention to provide a simple and inexpensive monitoring and control device in a vehicle.

It is another object of the invention to provide an arrangement for monitoring, processing, and recording usage or operational information in a vehicle.

It is yet another object of the invention to provide an arrangement for reading a portable instrument, and recording such information on a portable record carrier in the vehicle.

It is still another object of the invention to provide a simple and inexpensive control mechanism for performing a predetermined timed sequence of operations in a vehicle.

It is still another object of the invention to provide an arrangement for authorizing the operation of a vehicle.

It is still another object of the invention to provide a system of transportation whereby a class of users or subscribers provided with portable information-providing instruments are enabled to operate a plurality of vehicles.

It is still another object of the invention to provide an arrangement for recording identification and usage information on a portable record carrier in a vehicle.

One broad aspect of the invention concerns authorizing the operation of a vehicle by means of an identification instrument. These identification instruments are preferably small, portable objects which contain encoded information in some machine readable format. One example of such an identification instrument is a standard plastic, magnetically-encoded card. The information stripe on the card is read and processed by the arrangement provided by the present invention. The read identification information is compared with predetermined "key" information to produce a output signal, which may be utilized to authorize operation of a vehicle. One simple example of such a utilization technique is to provide an actuatable switch with the output signal, connected in series with the ignition circuit of the vehicle. If the comparison step results in authorization (i.e., the identification information matches the "key" information), the output signal closes the switch and the ignition circuit can be completed.

Another broad aspect of the invention concerns data recording and storage on a small, portable record carrier in the vehicle. The record carrier may store a succession of data records containing identification and/or usage information. Examples of such record carriers are magnetic tape cassettes, cartridges, and regular or miniature "floppy" disks. These record carriers are contained within the vehicle and in one embodiment of the invention, may only be removed from the system by designated individuals having physical access to them. The record carriers may then be physically transferred to an independent external computer system for printout or other processing.

Still another broad aspect of the invention concerns a novel and improved system of transportation, in which authorization, identification, and record keeping is provided for by the present invention. These systems of transportation comprise:
  automobile rental systems;
  company car fleets;
  vehicles owned or used by partnerships or clubs;
  community car systems; and
  personal rapid transit (PRT) systems.

Although the invention may be used for such systems of transportation, it is not intended to be limited to the particular systems cited above, since various modifications and structural changes may be made in any way from the spirit of the present invention.

Yet another broad aspect of the invention concerns the combination of autotransaction systems with a vehicle monitoring and control system. Such a combination provides facilities for automatic entry and recording of transaction data on the portable record carrier of the system.

A final broad aspect of the invention concerns the combination of the vehicle authorization system with a radio transmitting or transponder system for remote identification, authorization, and monitoring of the vehicle usage and operation. The autotransaction system may also be combined with the transmitting and receiving system to provide remote entry of transaction information.

The novel features which are considered as characteristic for the invention are set forth in particular in the appended claims. The invention itself, however, both as to its construction and its method of operaton, together with additional objects and advantages thereof will be best understood from the following description of specific embodiments when read in connection with the accompanying drawing. Parent application Ser. No. 538,356, filed Jan. 3, 1975, and grandparent application Ser. No. 432,691, filed Jan. 11, 1974, are hereby incorporated by reference.

Figure 1:
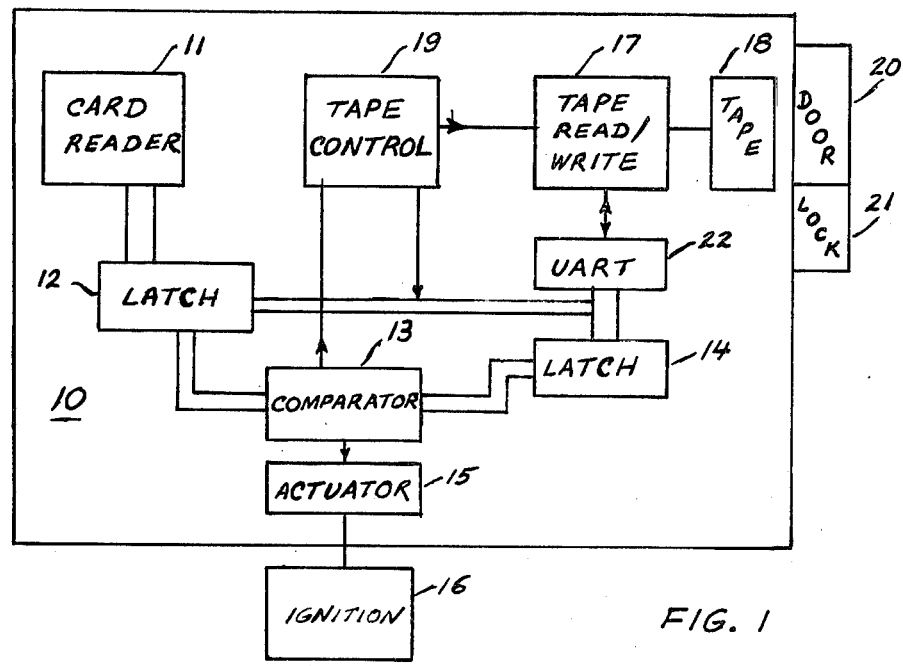
FIG. 1 is a highly simplified block diagram of the arrangement of a vehicle operation authorization and recording system according to the present invention.

Referring now more particularly to the drawing, it is to be understood that the illustrations of signal flow block diagrams are to be interpreted as including functional representations of microprograms in a general purpose programmable machine or microprocessor usable to accomplish the functions and operations described herein. Since programmable machines can take various forms and are well known and the programming of same to accomplish the desired functions can be varied, no detailed description of a particular program is included herein. A programmer of ordinary skill can construct a program for practicing the present invention based on simple known algorithms.

Turning now to FIG. 1, there is shown a highly simplified block diagram of the vehicle operation authorization and recording system according to the present invention. The system is contained within a small, compact integral unit 10 which may be secured to the front dashboard or control panel of the vehicle. The unit 10 is designed to prevent unauthorized access to the electronic components, the recording unit, and the tape cassette, so as to prevent tampering or "hot wiring." Such an integral unit is described in U.S. Pat. No. 3,773,138.

The embodiment of the invention shown in FIG. 1 is a relatively simple implementation of the concept of the present invention. A card reader 11 is provided for accepting and reading a standard magnetically-encoded card. The reader 11 may however represent any device for reading information from a portable information-containing instrument. The instrument may be, for example, a read only memory. In the preferred embodiment of the invention, the information contained on the card is translated into parallel digital signals which are stored in a register or latch 12. The data in the latch 12 is transferrable to one input of a comparator or processing device 13. In one particular embodiment of the invention, the portable information-containing instrument contains identification information, specifying the identity of the user of the vehicle. At least a portion of this identification information is transferred into the latch 12 for temporary storage, as well as transferrable into one input of the comparator or processing device 13. A second register or latch 14 holds predetermined "key" information which is indicative of the indentificaton information or numbers which are permitted to use the vehicle in which the system 10 is situated. The key information in the latch 14 is transferrable to another input of the comparator or processing means 13.

According to the intended operation of the present invention, the identification information from the first register or latch 12 is compared with the key information from the second register or latch 14 in the comparator or processing device 13. The comparator or processing device 13 is designed to activate an output when two inputted numbers satisfy a predetermined functional relationship. A simple functional relationship may be if the two numbers are equal. Another functional relationship would be if the indentification information number was larger than the key information number. More sophisticated functions, or tests such as parity or cyclic redundancy may also be utilized as a means as determining the validity of an identification information number by the comparator or processing device 13.

If the identification information-containing instrument is determined to be valid, the output signal from the comparator or processing device 13 activates an actuator 15 for affecting an operative characteristic of the vehicle or device associated with the vehicle. In the emobidment shown in FIG. 1, the acutator 15 closes a switch 16 which is in series connection with the ignition circuit of the vehicle. Thus, the vehicle is operable only if a valid instrument has been inserted in the card reader 11 and the appropriate determination of validity is made by the comparator or processing device 13. It is, of course, realized that the switch 16 may be any other type of operative device or characteristic which may be necessary for vehicle operation. In one embodiment, the insertion of a valid identification information-bearing card into the card reader 11 thereby serves to authorize operation of the vehicle by completing the ignition circuit.

Key information is read into the second register or latch 14 from a magnetic tape 18. The arrangement 10 also includes a tape read/write unit 17; a magnetic tape 18, such as in the form of a magnetic tape cassette; and a tape control unit 19, for specifying when the tape is to be read or written, or for performing other tape control functions such as forward and rewind. The cassette or tape 18 is enclosed within the arrangement 10 by means of a door 20, or other previliged access arrangement, in which access to the tape 18 from exterior of the arrangement 10 is controlled by means of a key 21 or other access control device. The access arrangement 20, 21 is designed to permit only authorized service personnel to have access to the tape 18.

Another aspect of the arrangement as shown in FIG. 1 is the recording of the identification number stored in the latch 12 on the tape 18. This is shown by the connection between the output of the comparator or processing means 13 and the tape control unit 19. Once the comparator or processing device 13 determines a valid identification number has stored in the latch 12, an output signal will be placed on the output of the comparator or processing device 13 for activation of the actuator 15 and read of the tape control 19. The tape control unit 19 will specify to the read/write unit 17 that an identification number in the latch 12 is to be read onto the tape 18. The tape control unit 19 will then make electrical connection between the latch 12 and a tape read/write unit 17, and activate the tape read/write unit 17 so that the information from the latch 12 is read onto the tape 18 for permanent storage on the tape 18.

In order to convert the parallel digital data from the latch 12 or latch 14 to the serial format for recording on the tape 18, a UART, or universal asynchronous receiver-transmitter, 22 is utilized. The UART 22 is a standard intergrated circuit which performs the required parallel-to-serial or serial-to-parallel conversion, as well as automatically providing stop and start bits, parity bits, or other appropriate indications on the tape 18 for separating and distinguishing data records. The parallel input/output of the UART 22 is connectable either with the latch 12 or the latch 14, under switch control of the tape control unit 19. The latch 12 may be arranged so that only a portion of the identificaton or other information read from the card inserted into the card reader 11 is transferred to the UART 22, thus recording at least a portion of the read information on a portable record carrier, such as a magnetic tape cassette. Furthermore, the comparator or processing device 13, or generally an enabling means, in the vehicle, is also optionally connectable with the reading means for processing the information read from the portable information providing unit.

Figure 2:
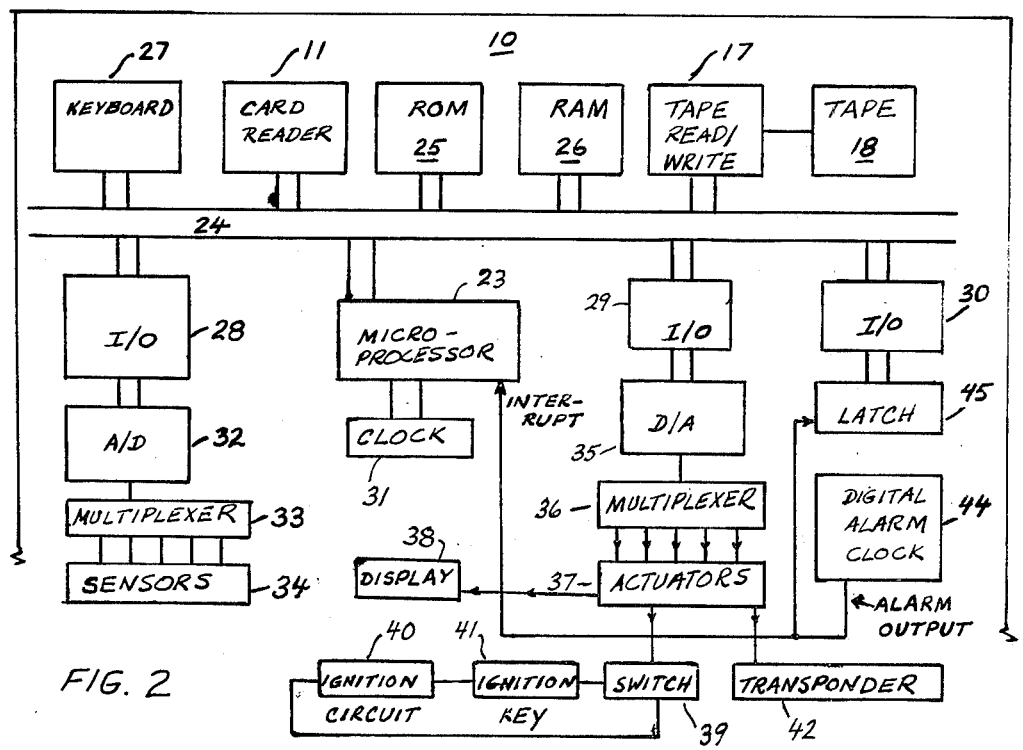
FIG. 2 is a highly simplified block diagram of a vehicle monitoring, processing, and recording system according to the present invention.

FIG. 2 is a highly simplified block diagram of another embodiment of the present invention for optionally monitoring, processing, and recording identification, usage, and/or operatonal information on a portable record carrier in the vehicle.

The arrangement of FIG. 2 is a slightly more complex electronic implementation of the data processing circuit of FIG. 1. In the emobidment of FIG. 2, the comparator or processing device 13 is replaced by a simple microprocessor 23. A microporcessor is an integrated circuit that performs a predetermined sequence of arithmetic or logical operations in a bit parallel fashion under stored program control. The microprocesser 23 therefore permits more sophisticated arithmetic or logical computations or calculations to be made with the identification information obtained from the card reader 11, or usage or operational data obtained from the vehicle itself. An example of the microprocessor 23 is the Intel 4004 or 4040.

In the arrangement according to the embodiment of FIG. 2, an optional card reader 11 is connected to a bi-directional data bus 24. Also connected to the data bus 24 is the microprocessor 23. A number of other components are also optionally connected to the data bus 24. These include a read only memory or ROM 25, a random access memory or RAM 26, the tape read/write unit 17, a keyboard 27, a first input/output interface device 28, a second input/output interface device 29, and a third input/output interface device 30.

Operations of the microprocessor 23 are synchronized by a clock oscillator 31. The control of operations of the microprocessor 23 is achieved by means of one or more stored control programs in the ROM 25.

The first optional input to the system along the data bus 24 is the card reader 11 and latch 12. The card reader 11 is adapted for reading the magnetic stripe on a plastic card, as described in connection with FIG. 1. Depending on the bit-length of the identificaton information, the data may be multiplexed during several descrete time intervals for transfer along the bus 24.

Another optional peripherial unit for attachment to the data but 24 is the keyboard 27. The keyboard 27 may consist of a series of program keys which the user of the system pushes in order to specify a specific operatonal control program for execution. Such operational control programs are stored in the ROM 25 and executed by the microprocessor 23. Such possible programs include the vehicle usage or operational characteristic monitoring functions, actuating functions, recording functions, or display functions, among others.

The RAM 26 is provided for storing data processed by the microprocessor 23.

Also optionally connected to the data bus 24 is the first input/output interface 28. Connected to the first input/output interface 28 is an analog-to-digital converter 32 which is in turn connected to a multiplexer 33, which is in turn connected to transducers or sensors 34 which are distributed about the vehicle. The sensors 34 are adapted for monitoring various operatons or characteristics of the vehicle or the ambient environment.

A second input/output interface 29 is also optionally connected to the data bus 24. Connected to the input/output device 29 is a digital-to-analog converter 35, which is in turn connected to a multiplexer 36, which is in turn connected to actuators 37. The digital-to-analog converter 35 converts digital signals from the data bus 24 into analog signals for operating actuators situated throughout the vehicle for performing various operational functions in the vehicle. An example of such output functions may include an actuator for activating a switch 39 which is in a series circuit with the ignition circuit 40 and the ignition lock 41 of the vehicle. Such an actuator therefore serves as a means of authorizing operation of the vehicle when a predetermined condition has been satisfied and an appropriate authorization signal sent over the data bus 24. Another output from the second input/output 29 is a digital or alphanumeric display 38 (LED'S, liquid crystal, etc.) of information from the data bus 24. Such information may be direct digital information obtained from the sensors 34, or processed information obtained from processing the information obtained from the sensors 34 by microprocessor 23. Another optional output from the input/output interface 29 is a transponder 42. The transponder code may be set reflecting information transferred along the bus 24.

Transponder devices are well known in the avionics art, and need not be described in detail here. A transponder comprises a plurality of predetermined response modes (or "codes") which may be set manually on the unit itself by the user, or may be performed automatically by the arrangement of the present invention. For example, the transponder code may specify the digits of the user's identification number, or usage data (e.g. starting milage), operational data (e.g. oil temperature), or autotransaction data (a code set by the user indicating a sales trip, for example). The transponder may also be used for emergency purposes to call for help by transmitting a particular code (e.g. code 7700). The transponder may also be set in an "IDENT" mode to particularly alert the interrogating unit that a particular vehicle is transmitting "IDENT."

In a personal rapid transit system, the transponder may be used to indicate the desired destination and track of the vehicle. U.S. Pat. Nos. 3,341,845 and 3,389,391 are herein incorporated by reference to illustrate transponder systems in a vehicle.

It is again pointed out that the information is transferred along the data bus 24 may consist of information derived from the keyboard 27, the card reader 11, the tape unit 17, or the first input/output interface 28, which is connected to sensors 34 which measure operative vehicle or environmental parameters. Such information may be used directly or processed in arithmetic or logical fashion by the microprocessor 23 under control of a predetermined and preselected control program stored in ROM 25. Such raw or processed data may then be transferred to a magnetic cassette 18, for permanent storage in the vehicle; or through the input/output interface 29, for display on display 38, or use in activation of actuators 37 in the vehicle for performing specific operational functions, or transferred to a transponder 42 or other communications systems for communications to a remote receiver 43.

The third input/output interface 30 connected to the data bus 24 is adapted for connecting the data to a digital alarm clock 44. The digital alarm clock 44 is another standard integrated circuit which has an input of "hours", "minutes", and "alarm enable". After a predetermined set period of time has elapsed, the alarm output 46 is activated. The alarm output 46 is connected to the interrupt pin of the microprocessor 23. Upon receiving an indication of an interrupt, the microprocessor 23 will jump to an interrupt routine in the ROM 25 and begin execution of the interrupt routine. The use of the digital alarm clock 44 therefore permits a predetermined sequence of operatons to be sequentially performed by the microprocessor 23 by being repeatedly interrupted at predetermined timed intervals. Such intervels may be preset by any means of accessing the third input/output interface 30, that is, from the keyboard 27, card reader 11, ROM 25, read/write unit 17, or input/output interface 28. The information received from the input/output interface 30 is stored in the latch 45 for insertion into the digital clock for setting the digital clock 44 at an appropriate time. The line 46 is shown also connected to the latch 45 so that whenever the alarm of the digital clock 44 is enabled, a new alarm setting will be provided to the digital clock on the basis of the information stored in the latch 45.

The digital clock 44 therefore enables any timed sequential series of operatons to be performed by the microprocessor, either sensing operations using sensors 34, card reading operation 11, tape read/writing operation 17, or actuating or display operations 37 or 38.

The present invention may be utilized in a vehicle for monitoring operative characteristics, and recording such characteristics on the magnetic tape at predetermined timed intervals (e.g. every 5 minutes, every hour, every 24 hours) determined by the setting of the digital alarm clock.

Another application of the invention is in a rental or community car system, where identification and usage (e.g. milage) information is stored on the magnetic tape cassette.

Another application of the invention is to permit operative characteristics of the vehicle to be modified in response to sensed conditions (e.g. application of carburator heat in a light aircraft).

Another application of the invention is in a personal rapid transit system. Since the system is "personal", access to such a system is limited to subscribers who are issued identification cards to authorize operation of the PRT vehicle. The autotransaction system is utilized to indicate the desired destination of the vehicle. The transponder or communications system, together with external, remote monitoring systems (such as those described in U.S. Pat. No. 3,644,883), may indicate the desired destination to the central control system of the transportation system.

What is claimed is:

1. A digital control system for use in a vehicle for selecting one of a plurality of operational modes at a perdetermined time, comprising means in said vehicle for selecting an operational mode of said vehicle, having an input for designating a predetermined one of said modes;

means for activating operation of said vehicle in said selected one mode, having an input for initiating activation thereof;

a digital alarm clock in said vehicle for storing a representation of a first predetermined time at which a first predetermined one of said operational modes should be activated, having an input for resetting said stored time, and having an output connected to said input of said activating means for supplying a signal when said first predetermined time occurs; and means connected to said input of said digital alarm clock for automatically resetting said digital alarm clock to a representation of second predetermined time in response to said output signal of said clock.

2. The system as defined in claim 1, further comprising means for controlling operative characteristics of said vehicle according to said predetermined operational mode determined by said selecting means comprising data input means in said vehicle for deriving data from sensor means;

memory means for storing at least one control program; and a microprocessor for processing said derived data from said sensor means with said control program in response to said output signal from said digital alarm clock, and controlling said operative characteristics.

3. An arrangement for use in a vehicle, comprising means in said vehicle for reading information from an information-providing instrument;

enabling means in said vehicle connectable with said reading means for processing said information;

recording means in said vehicle connectable with said reading means in said vehicle for recording at least a portion of said information; and manually actuatable keyboard means connectable with said recording means for recording information entered on said keyboard means.

4. The arrangement as defined in claim 3, wherein said recording means records said portion of said information on a portable record carrier.

5. The arrangement as defined in claim 3, wherein said reading means comprises a reader for reading said information from said instrument, and register means for storing said read information.

6. The arrangement as defined in claim 3, wherein said enabling means comprises register means for storing predetermined key information;

means for comparing said key information with said read information; and actuator means, for controlling the authorization of operation of the vehicle, said actuator means being activated upon said comparing means indicating the satisfaction of a predetermined functional relationship between said key information and said read information.

7. The arrangement as defined in claim 3, wherein said information-providing instrument is a read-only memory.

8. The arrangement as defined in claim 3, further comprising data inputmeans in said vehicle for providing data from a sensor in said vehicle;

wherein said enabling means is connected to said data input means and is operative for processing at least a portion of said data; and wherein said recording means is connectable with said enabling means for outputting at least a portion of said input data processed by said enabling means to a portable record carrier.

9. The arrangement for use in a vehicle, comprising data input means in said vehicle for providing data from data acquisition means in said vehicle;

enabling means comprising a microprocessor in said vehicle connectable with said data input means for processing said informaton; and recording means in said vehicle connectable with said reading means in said vehicle for recording at least a portion of said data on a record carrier.

10. The arrangement as defined in claim 9, wherein said data acquisition means comprises a sensor in said vehicle for obtaining usage information.

11. The arrangement as defined in claim 9, wherein said microprocessor means comprises a microprocessor and a memory.

12. The arrangement as defined in claim 9, further comprising a receiver station remote from said vehicle; and means in said vehicle for transmitting at least a portion of said data to said remote staton.

13. The arrangement as defined in claim 9, further comprising means in said vehicle for controlling an operative characteristic of said vehicle subsequent to said data being processed by said enabling means.

14. A combination comprising means in a vehicle for reading information from an information-providing instrument;

microprocessor means in said vehicle connectable with said reading means for processing at least a portion of said information; and atiming means connected to said enabling means for specifying a predetermined time for processing a predetermined portion of said information.

15. The combination as defined in claim 14, wherein said information-providing instrument comprises a memory.

16. The combination as defined in claim 14, wherein said timing means comprises a clock oscillator.

17. A combination comprising means in a vehicle for reading informaton from a read-only memory means;

enabling means in said vehicle connectable with said reading means for processing at least a portion of said information; and timing means connected to said enabling means for specifying a predetermined time for processing a predetermined portion of said information.

18. The combination as defined in claim 14, wherein said timing means comprises a clock oscillator.

19. An arrangement for use in a vehicle comprising:

means in said vehicle for abstracting information for an information-providing instrument;

data input means in said vehicle for obtaining data from a sensor in said vehicle;

enabling means comprising a microprocessor in said vehicle connectable with said abstracting means and said data input means for processing at least a portion of said abstracted information and said obtained data; and output means in said vehicle connected to said enabling means enregistering said processed data.

20. The arrangement as defined in claim 19, wherein said information-providing instrument comprises a read-only memory.

* * * * *